United States Patent [19]

Krehnovi

[11] Patent Number: 5,294,759

[45] Date of Patent: Mar. 15, 1994

[54] REPLACEMENT WINDSHIELD WASHER SWITCH ACTUATOR LEVER FOR A TURN SIGNAL ARM ASSEMBLY

[76] Inventor: Michael E. Krehnovi, 214 Summerfield Dr., Baden, Pa. 15005

[21] Appl. No.: 937,296

[22] Filed: Aug. 26, 1992

[51] Int. Cl.⁵ .............................................. H01H 9/08
[52] U.S. Cl. ................................ 200/61.27; 200/61.54
[58] Field of Search ............... 200/61.27, 61.54, 61.85, 200/335; 180/333

[56] References Cited

U.S. PATENT DOCUMENTS

| | | | |
|---|---|---|---|
| 4,149,048 | 4/1979 | Winter | 200/61.54 |
| 4,723,057 | 2/1988 | Lane, Jr. | 200/61.27 |
| 4,849,585 | 7/1989 | Vidican et al. | 200/61.54 |

Primary Examiner—A. D. Pellinen
Assistant Examiner—Michael A. Friedhofer
Attorney, Agent, or Firm—Volpe and Koenig

[57] ABSTRACT

A replacement windshield washer switch actuator lever is used in the repair of a turn signal arm assembly for certain models of motor vehicles produced by General Motors. The replacement actuator lever is comprised of a hollow sleeve for mounting on the turn signal arm assembly. One end of the sleeve is selectively configured as a lever for manual operation, and the opposite end is configured to engage the washer switch in the steering column. An aperture is defined in the sleeve to complement the position of the cruise control wire harness for receiving the wire harness therethrough. Sleeve aperture access means permit installation of the actuator lever without damaging or disconnecting the wire harness. Preferably, the aperture access means comprises a slot in the sleeve extending from the aperture through the lever end of the sleeve.

10 Claims, 3 Drawing Sheets

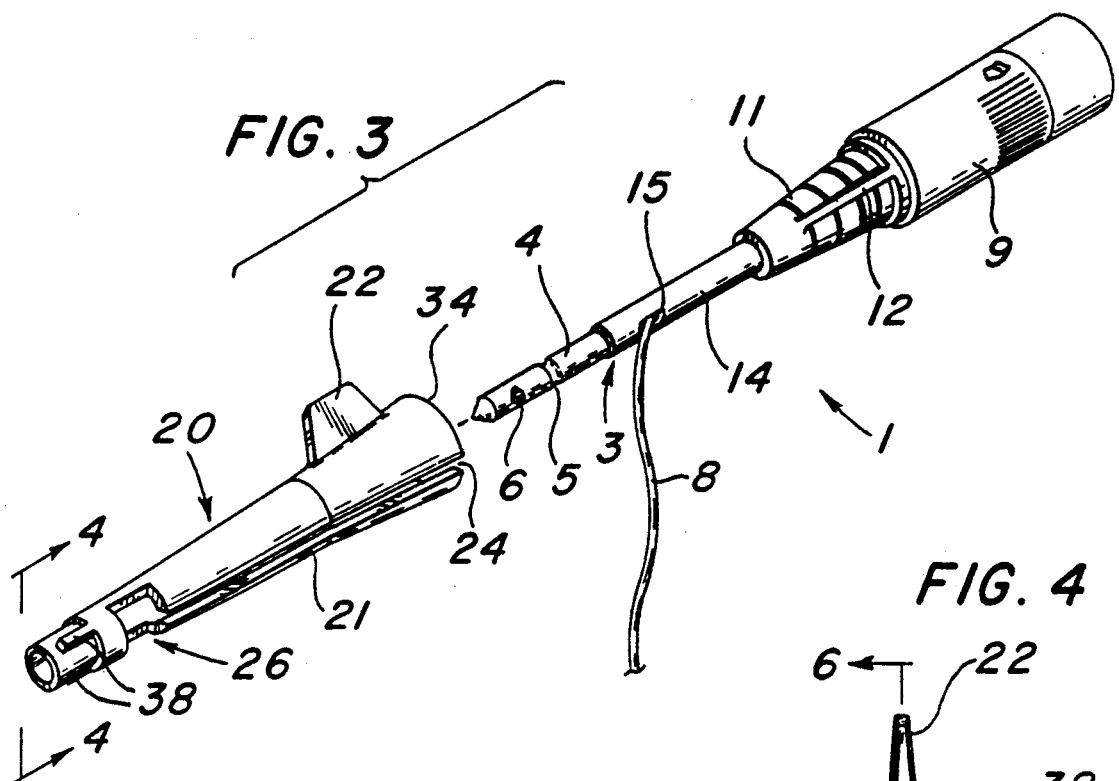
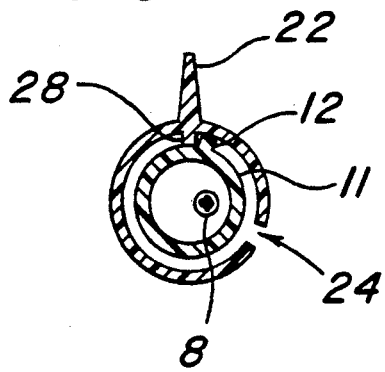
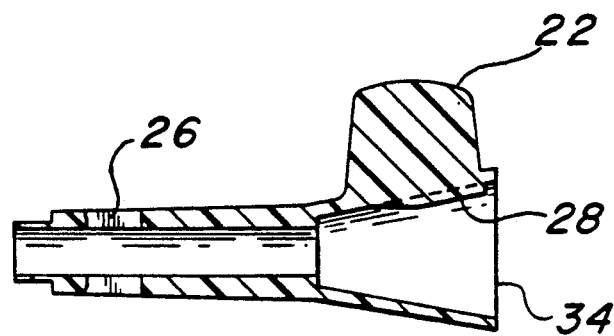

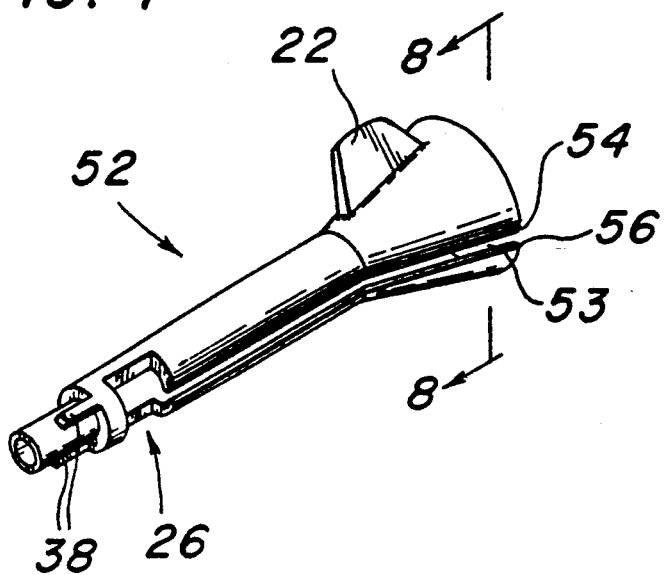
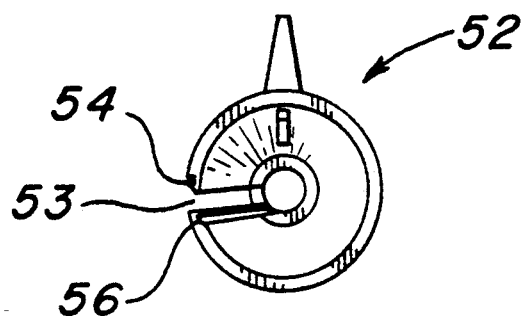
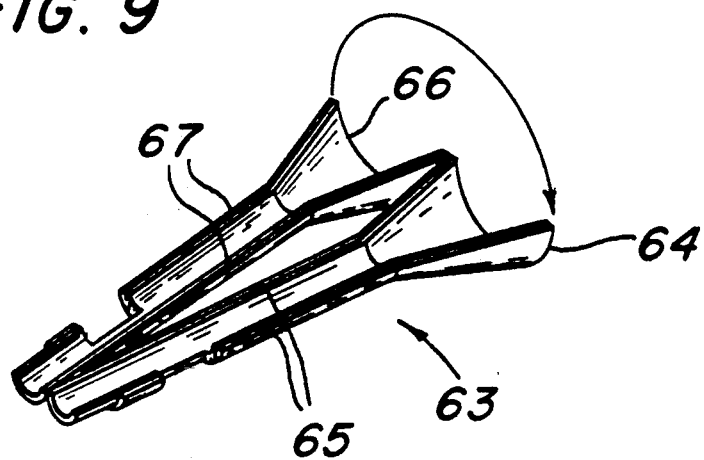

REPLACEMENT WINDSHIELD WASHER SWITCH ACTUATOR LEVER FOR A TURN SIGNAL ARM ASSEMBLY

The present invention relates to a replacement windshield washer switch actuator lever for a motor vehicle turn signal arm assembly. More particularly, it relates to a replacement actuator lever for a turn signal arm assembly having windshield washer, wiper and cruise controls. Most particularly, the replacement actuator lever finds use in the repair of certain General Motors turn signal arm assemblies in which the original equipment actuator lever has been damaged.

BACKGROUND OF THE INVENTION

In certain motor vehicles produced by General Motors, the windshield wiper, washer and cruise controls are located in a control housing on a free end of a turn signal arm assembly. These include, inter alia, certain models of Chevrolet, Buick, Oldsmobile, Pontiac and Cadillac passenger cars built from 1980 to 1989; Chevrolet and GMC trucks built from 1980 to 1989; Suburban, Blazer and S10 trucks built form 1980 to 1991; and Chevrolet and GMC full size vans built from 1980 to 1991.

If the windshield washer switch actuator lever on the turn signal arm is damaged, the entire turn signal arm assembly is conventionally replaced with a new original equipment manufacturer (OEM) part. This is because the OEM actuator lever is configured with an aperture for the cruise control wire harness to pass through. If a replacement OEM actuator lever were available, it would still be impossible to install because there is insufficient clearance to feed the wire harness through the aperture and install the actuator lever on the turn signal arm at the same time.

In order to install a replacement OEM turn signal arm assembly, the damaged assembly must first be removed from the steering column. This entails releasing the arm itself from a switch assembly in the steering column through the disengagement of a spring clip. The cruise control wire harness under the dashboard must be located and disconnected. An auxiliary piece of wire is attached to the wire harness, and the wire harness and auxiliary wire are pulled up through the steering column.

The replacement OEM assembly is then installed by attaching the auxiliary wire to the new cruise control wire harness, and rethreading it through the steering column. The new wire harness is then reconnected under the dash, and the replacement turn signal arm is aligned and engaged in the switch assembly in the steering column. Depending on the vehicle model, this process also requires partial disassembly of the steering column in order to remove and reinstall the cruise control wire harness.

In addition to the expense of a replacement OEM turn signal arm assembly, the process of installing a replacement OEM part is time consuming and laborious. Thus, repairing a broken windshield washer actuator lever ties up the vehicle involved for a relatively lengthy amount of time.

SUMMARY OF THE INVENTION

The present invention provides a replacement windshield washer switch actuator lever for a motor vehicle turn signal arm assembly which has windshield washer, wiper and cruise controls located on it. The turn signal arm assembly is comprised of an arm and a control housing. The control housing is affixed to the free end of the turn signal arm, and the controls are located on it. A cruise control wire harness protrudes from an aperture located at a medial point in the arm.

The replacement washer switch actuator lever is comprised of a hollow sleeve for mounting about the arm having one end selectively configured to complementarily abut the control housing. An aperture is defined in the sleeve such that the sleeve aperture is in alignment with the arm aperture when the sleeve abuts the housing which permits the wire harness to extend through the sleeve. The end of the sleeve is also selectively configured for manual operation. The opposite end of the sleeve is configured to activate a washer switch in the steering column of the vehicle.

The actuator lever is configured with sleeve aperture access means to permit replacement of a broken lever without disconnection of the wire harness. Preferably, the sleeve has a slot which extends from the wire harness aperture in the sleeve to the lever end of the sleeve. The actuator lever is slidably installed on the arm by aligning the slot in the sleeve with the wire harness and axially displacing the lever until it abuts the housing. This results in the wire harness extending through the sleeve aperture.

It is an object of this invention to provide a replacement windshield washer switch actuator lever for repairing a turn signal arm assembly having windshield washer, wiper and cruise controls located thereon, instead of requiring replacement of the entire turn signal arm assembly.

It is a further object of this invention to provide a method for replacing a windshield washer switch actuator lever located on a turn signal arm assembly having windshield washer, wiper and cruise controls located thereon.

Other objects and advantages of the invention will be apparent from the following detailed description of a presently preferred embodiment.

BRIEF DESCRIPTION OF THE DRAWINGS

FIG. 3 is a reverse angle exploded perspective view of the turn signal arm assembly shown in FIG. 2.

FIG. 4 is a view along line 4—4 in FIG. 3.

FIG. 5 is a section along line 5—5 in FIG. 2.

FIG. 6 is a section along line 6—6 in FIG. 4.

FIG. 7 is a perspective view of a second embodiment of the invention.

FIG. 8 is a view along line 8—8 in FIG. 7.

FIG. 9 is a perspective view of a third embodiment of the invention.

DESCRIPTION OF THE PREFERRED EMBODIMENT

Figure 1:
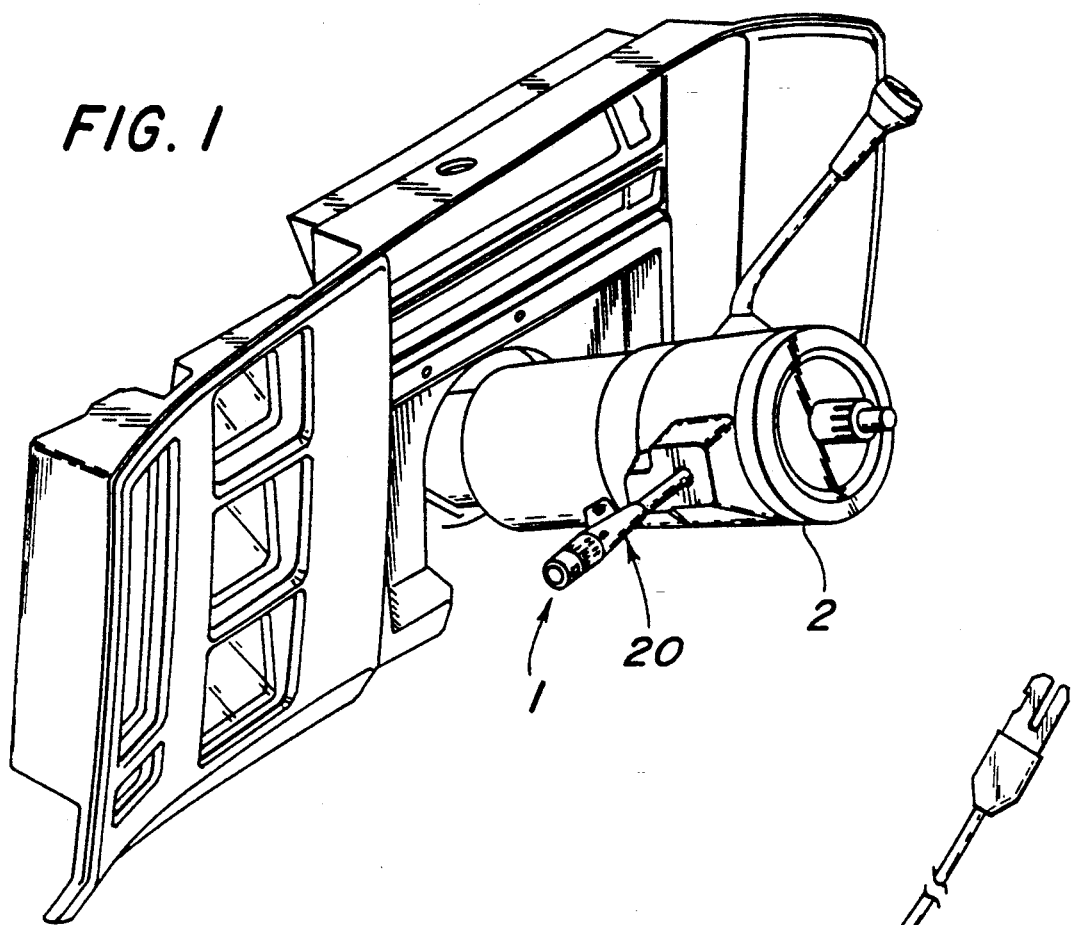
FIG. 1 is a perspective view of an installed turn signal arm assembly having a windshield washer lever arm made in accordance with the teachings of the present invention.

Referring to FIG. 1, there is shown a repaired turn signal arm assembly 1 attached to a steering column 2 in a conventional motor vehicle driver's side arrangement. The steering wheel is not shown for clarity. A replacement windshield washer switch actuator lever 20 is located on turn signal arm assembly 1.

Figure 2:
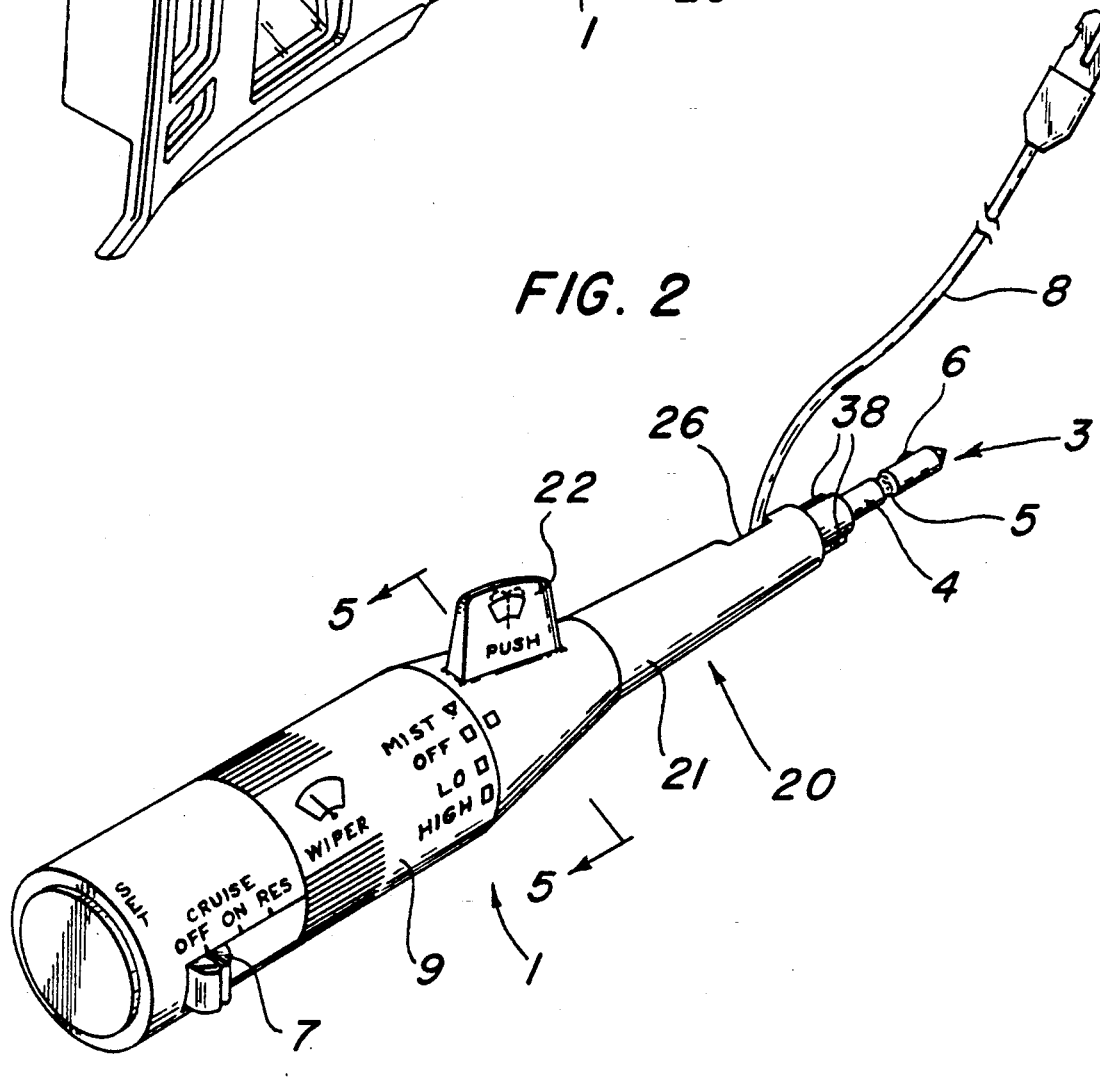
FIG. 2 is an enlarged perspective view of a turn signal arm assembly shown in FIG. 1.

Referring to FIG. 2, the turn signal arm assembly 1 is shown in more detail. The configuration of the assembly 1 is compatible with a variety of models of General Motors cars and trucks produced between 1980 and 1991. These include 1980 to 1989 Chevrolet, Buick, Oldsmobile, Pontiac and some Cadillac passenger cars; 1980 to 1989 Chevrolet and GMC trucks; 1980 to 1991 Suburban, Blazer and S-10 trucks; and 1980 to 1991 Chevrolet and GMC full size vans.

As shown in FIGS. 2 and 3, the turn signal arm assembly is comprised of an arm 3 with a control housing 9 attached to the free end. The arm 3 is further comprised of a shaft 4 having a annular groove 5 and a projection 6. The groove 5 is used to releasably retain the turn signal arm assembly 1 in a switch assembly (not shown) in the steering column 2. The shaft 4 is affixed to an end of a hollow tube 14, and the opposite end of tube 14 is attached to control housing 9.

A cruise control switch 7 is disposed in the housing 9. Internally connected to the cruise control switch 7 is a cruise control wire harness s which runs through the housing 9 and tube 14, exiting the tube 14 through an aperture 15.

The housing 9 is further comprised of a tapered portion 11 which necks down to the tube 14. A raised projection 12 extends from the tapered portion 11 of the housing 9.

A replacement windshield washer switch actuator lever which embodies the present invention, is shown in more detail in FIGS. 3-6. The actuator lever 20 is slidably disposed on the arm 3.

The actuator lever 20 is comprised of a hollow sleeve 21 which has an interior selectively configured to complement the housing 9 and the shaft 3. In particular, one end of the sleeve is flared to complement the tapered portion 11 of the housing 9.

An aperture 26 in the sleeve 21 is located in a position complementary to the wire harness aperture 15 in the tube 14. A slot 24 extends from the aperture 26 through the flared end of the sleeve 21.

A push lever 22 projects from the flared end of the sleeve 21. The other end of the sleeve 21 has two selectively configured projections 38 for engaging and actuating the windshield washer switch (not shown).

The relative positions of projections 38 can be seen most clearly in FIG. 4. With the push lever 22 shown in an upright vertical position, the first projection 38 is located 75° clockwise from the push lever 22. The second projection 38 is located 210° clockwise from the push lever.

Referring to FIGS. 5 and 6, an internal projection 28 depends from the flared end portion of the sleeve 21 directly beneath the push lever 22. The projection 28 is designed to complementarily engage raised projection 12 on the tapered portion 11 of housing 9

In operation, the windshield washer is activated by applying force on the push lever 22 which causes the sleeve 21 to rotate about the arm 3. The internal projection 28 on the windshield washer switch actuator lever 20 engages the projection 12 on the housing 9 causing the arm 3 and the projections 38 to rotate. This activates the windshield washer switch. In certain models, the projection 12 on the housing 9 is omitted and the switch is activated solely by means of the projections 38 engaging the washer switch within the steering column.

The replacement washer switch actuator lever 20 is molded from a suitable plastic material. Preferably, ABS, which is a polymer consisting of varying ratios of acrylonitrile, butadiene, and styrene monomers, commonly available from variety of manufacturers such as Borg-Warner or Dow Chemical, is used. Preferably, the surface of the lever 22 is the natural black ABS molded plastic, or is vacuum metallized to provide a chrome appearance.

Repair of a broken windshield washer switch actuator lever, as disclosed by the present invention, is much simpler and less time consuming than the conventional method which requires installation of a replacement OEM turn signal arm assembly. The repair requires the removal of the turn signal arm assembly 1 from the steering column 2 by disengaging the arm assembly 1 from the switch in the steering column. The original equipment windshield washer switch actuator lever (not shown) is cut or broken away from the turn signal arm assembly 1 and removed taking care not to damage the cruise control wire harness 8. Cutting or breaking the OEM actuator lever is required because it lacks a slot or other means to allow for its removal.

The replacement windshield Washer switch actuator lever 20 is installed by first aligning the slot 24 with the cruise control wire harness 8 which protrudes from the aperture 15 on the arm 3, as shown in FIG. 3. The replacement actuator lever 20 is then slid onto the arm 3 such that the first end 34 of sleeve 21 abuts the tapered portion 11 fixed control housing 9, and the wire harness s is located in the aperture 26. The repaired turn signal arm assembly 1 is then reinstalled into the switch assembly in the steering column 2.

As compared to the conventional repair method, the disclosed method provides both cost and labor savings by providing a means for repairing the washer switch actuator lever instead of replacing the entire turn signal arm assembly. Additionally, the present method eliminates the costly labor required to disconnect the wire harness 8, unthread it from the steering column assembly, and rethread and reconnect the wire harness to complete the repair. When a repair using the above method is complete, the repaired turn signal arm assembly 1 will function identically to the original equipment part.

Although designed as a replacement part, the slotted lever arm 20 could be utilized in the OEM assembly to provide an improved OEM turn signal arm assembly. The incorporation of the slotted lever arm into the design of the OEM assembly eliminates the need for cutting away the broken lever in the disclosed repair method since such a slotted lever can be slid off the arm assembly.

As detailed above, the inventive replacement lever is preferably made in one piece of a rigid material. However, alternative functionally equivalent configurations are within the scope of the invention. For example, as shown in FIGS. 7 and 8, a replacement level 52 is configured with a closeable slot 53 having matingly engageable opposing slot edges 54 and 56. The replacement lever 52 is made of a relatively pliant material to permit the slot to be opened to a sufficient degree to enable installation about the turn signal arm. For installation, the pliant replacement lever 52 is disposed about the turn signal arm and the opposing slot edges 54 and 56 are matingly engaged to secure the replacement lever 52 in its installed position.

A third embodiment of the replacement actuator lever 63, as shown in FIG. 9, is configured as two semicylindrical portions 64 and 66. Opposing edges 65, 67 of the two-semi-cylindrical portions 64 and 66, are configured for mating engagement. With this construction, the replacement lever is installed by snapping the two pieces 64, 66 together about the turn signal arm.

I claim:

1. A replacement windshield washer switch actuator lever for a motor vehicle turn signal arm assembly having an arm and a control housing, the control housing secured on a free end of the arm and having windshield washer, wiper and cruise controls located thereon, a cruise control wire harness protruding from an aperture located at a medial point in the arm which is connected to a motor vehicle electrical system, wherein the replacement washer switch actuator lever comprises:
   a hollow sleeve for mounting about the arm having a first end selectively configured to complementarily abut the control housing;
   an aperture defined in said sleeve such that said sleeve aperture is in alignment with the arm aperture when said first sleeve end abuts said housing;
   said first end of the sleeve being further selectively configured for manual operation;
   a second end of the sleeve having washer switch activation means; and
   said sleeve being configured with a slot extending from said sleeve aperture to said first sleeve end such that said actuator lever is slidably installable without disconnecting the wire harness by aligning said slot with the wire harness and axially displacing said lever until said first end abuts the housing whereby the wire harness extends through said sleeve aperture.

2. The actuator lever of claim 1 wherein said replacement washer switch actuator lever is one piece made of a molded thermoplastic material.

3. The actuator lever of claim 2 wherein said thermoplastic material is a polymer consisting of acrylonitrile, butadiene, and styrene monomers.

4. The actuator lever of claim 1 wherein said switch activation means is comprised of two selectively configured, radially disposed projections.

5. A replacement windshield washer switch actuator lever for a motor vehicle turn signal arm assembly having an arm and a control housing, the control housing secured on a free end of the arm and having windshield washer, wiper and cruise controls located thereon, a cruise control wire harness protruding from an aperture located at a medial point in the arm which is connected to a motor vehicle electrical system, wherein the replacement washer switch actuator lever comprises:
   a hollow sleeve for mounting about the arm having a first end selectively configured to complementarily abut the control housing;
   an aperture defined in said sleeve such that said sleeve aperture is in alignment with the arm aperture when said first sleeve end abuts said housing;
   said first end of the sleeve being further selectively configured for manual operation;
   a second end of the sleeve having washer switch activation means; and
   said sleeve being one piece of a pliant material, which includes a slot extending from said sleeve aperture to said first sleeve end, and includes matingly engageable opposing slot edges, such that said actuator lever is installable on the arm without disconnecting the wire harness with said opposing slot edges being matingly engaged so that the wire harness extends through the sleeve aperture after installation.

6. A replacement windshield washer switch actuator lever for a motor vehicle turn signal arm assembly having an arm and a control housing, the control housing secured on a free end of the arm and having windshield washer, wiper and cruise controls located thereon, a cruise control wire harness protruding from an aperture located at a medial point in the arm which is connected to a motor vehicle electrical system, wherein the replacement washer switch actuator lever comprises:
   a hollow sleeve for mounting about the arm having a first end selectively configured to complementarily abut the control housing;
   an aperture defined in said sleeve such that said sleeve aperture is in alignment with the arm aperture when said first sleeve end abuts said housing;
   said first end of the sleeve being further selectively configured for manual operation;
   a second end of the sleeve having washer switch activation means; and
   said sleeve being configured as two semi-cylindrical portions with means to matingly engage opposing edges of said semi-cylindrical portions such that said actuator lever is installable without disconnecting the wire harness with said opposing edges being matingly engaged so that the wire harness extends through the sleeve aperture after installation.

7. An improved motor vehicle turn signal arm assembly having windshield washer, wiper and cruise controls comprising:
   a turn signal arm and a control housing, said control housing secured to a free end of said turn signal arm;
   a cruise control wire harness protruding from an aperture located at a medial point in said arm;
   a washer switch actuator lever further including a hollow sleeve for mounting about said arm having a first end selectively configured to complementarily abut said control housing;
   an aperture defined in said sleeve such that said sleeve aperture is in alignment with said shaft aperture when said first sleeve end abuts said housing; and
   said sleeve being configured with a slot extending from said sleeve aperture to said first sleeve end such that said actuator lever is slidably displaceable relative to said arm without disconnecting said wire harness between an installed position on said arm whereat said first end abuts said housing and the wire harness extends through said sleeve aperture and an uninstalled position whereat said lever is removed from said arm.

8. The actuator lever of claim 7 wherein a second end of said sleeve is selectively configured with washer switch activation means.

9. A method for replacing a broken windshield washer switch actuator lever for a turn signal arm assembly having an arm for mounting the assembly on a steering column and having windshield washer, wiper and cruise controls located in a turn signal housing mounted on a free end of the turn signal arm, a cruise control wire harness protruding from a medial aperture in the arm which is connected to a motor vehicle electrical system, the method comprising:
   (a) providing a replacement washer switch actuator lever including a hollow sleeve for mounting about the arm having a first end selectively configured to complementarily abut the control housing, an aperture defined in said sleeve such that said sleeve aperture is in alignment with the shaft aperture when said first sleeve end abuts the housing, said replacement actuator lever being provided with a slot extending from said sleeve aperture to said first sleeve end (b) disconnecting the turn signal arm assembly shaft from the steering column;

(c) removing the broken windshield washer switch actuator lever from the turn signal arm assembly;

(d) while the wire harness protrudes from the turn signal arm, installing said replacement actuator lever including the steps of aligning said slot with the cruise control wire harness protruding from the medial aperture in the turn signal arm and axially displacing said replacement actuator lever onto the turn signal arm until said sleeve first end abuts the housing whereby the wire harness extends through said sleeve aperture; and (e) reinstalling the turn signal arm assembly into the steering column.

10. A method for replacing a broken windshield washer switch actuator lever for a turn signal arm assembly having an arm for mounting the assembly on a steering column and having windshield washer, wiper and cruise controls located in a turn signal housing mounted on a free end of the turn signal arm, a cruise control wire harness protruding from a medial aperture in the arm which is connected to a motor vehicle electrical system, the method comprising:

(a) providing a replacement washer switch actuator lever including a hollow sleeve for mounting about the arm having a first end selectively configured to complementarily abut the control housing, an aperture defined in said sleeve such that said sleeve aperture is in alignment with the shaft aperture when said first sleeve end abuts the housing, said replacement actuator lever being configured as two semi-cylindrical pieces having opposing matingly engageable edges;

(b) disconnecting the turn signal arm assembly shaft from the steering column;

(c) removing the broken windshield washer switch actuator lever from the turn signal arm assembly;

(d) while the wire harness protrudes from the turn signal arm, installing said replacement actuator lever including the steps of disposing said semi-cylindrical pieces about the turn signal arm and matingly engaging said edges such that said sleeve first end abuts the housing and the wire harness extends through said sleeve aperture; and (e) reinstalling the turn signal arm assembly into the steering column.

* * * * *